US006961728B2

(12) United States Patent
Wynblatt et al.

(10) Patent No.: US 6,961,728 B2
(45) Date of Patent: Nov. 1, 2005

(54) SYSTEM AND METHODS FOR HIGHLY DISTRIBUTED WIDE-AREA DATA MANAGEMENT OF A NETWORK OF DATA SOURCES THROUGH A DATABASE INTERFACE

(75) Inventors: Michael Wynblatt, Pleasant Hill, CA (US); Julio Cesar Navas, Concord, CA (US)

(73) Assignee: Centerboard, Inc., Pleasanton, CA (US)

( * ) Notice: Subject to any disclaimer, the term of this patent is extended or adjusted under 35 U.S.C. 154(b) by 277 days.

(21) Appl. No.: 10/096,209

(22) Filed: Mar. 11, 2002

(65) Prior Publication Data

US 2002/0143755 A1 Oct. 3, 2002

Related U.S. Application Data

(63) Continuation-in-part of application No. 09/726,702, filed on Nov. 28, 2000, now Pat. No. 6,778,987.
(60) Provisional application No. 60/275,429, filed on Mar. 12, 2001.

(51) Int. Cl.[7] .............................................. G06F 17/30
(52) U.S. Cl. .................. 707/10; 707/104.1; 707/103 R; 707/6
(58) Field of Search ............................... 707/10, 104.1, 707/6, 102, 103 R, 101, 103, 227, 104

(56) References Cited

U.S. PATENT DOCUMENTS

| | | | |
|---|---|---|---|
| 4,635,189 A | | 1/1987 | Kendall ...................... 364/200 |
| 5,093,782 A | | 3/1992 | Muraski et al. ............. 395/600 |
| 5,179,660 A | | 1/1993 | Devany et al. ............. 395/200 |
| 5,301,339 A | | 4/1994 | Boasson ..................... 395/800 |
| 5,953,716 A | | 9/1999 | Madnick et al. ............... 707/4 |
| 6,009,428 A | * | 12/1999 | Kleewein et al. ............. 707/10 |
| 6,353,836 B1 | * | 3/2002 | Bamford et al. ............ 707/203 |
| 6,606,660 B1 | * | 8/2003 | Bowman-Amuah ......... 709/227 |

OTHER PUBLICATIONS

Julio C. Navas and Tomasz Imielinski, GeoCast—Geographic Addressing and Routing, ACM MobiCom, Aug. 1999.

Pavlin Ivanov Radoslavov, Deborah Estrin, Ramesh Govindan, Exploiting the Bandwidth-Memory Tradeoff in Multicast State Aggregation, University of Southern California, Department of Computer Science Information Sciences Institute, Jul. 1, 1999, USC Dept. of Computer Science Technical Report 99-697 (Second Revision).

David Gelernter, Generative Communication in Linda, ACM Transactions on Programming Languages and Systems, vol. 7, No. 1, Jan. 1985, pp. 80-112.

(Continued)

Primary Examiner—Jean M. Corrielus
(74) Attorney, Agent, or Firm—Michael A. Glenn; Glenn Patent Group

(57) ABSTRACT

Methods and a system that provide a network of data sources in terms of a traditional database schema, convert traditional database queries into network messages, and route those messages to those data sources which have relevant data, in some instances through designated query nodes. In the present invention, those data sources accept the message, and then send reply messages to the originator of the query, or via designated join nodes in some embodiments. In some embodiments, the data sources may be able to perform local join operations. The system then collects these reply messages as appropriate at the designated join nodes, designated query nodes, and/or at the data sources, and the reply messages that meet the requirements of the query are sent back to the query originator. The query results provided to the query originator are presented as a traditional database result.

76 Claims, 6 Drawing Sheets

OTHER PUBLICATIONS

Philippe Bonnet, Johannes Gehrke, Tobias Mayr and Praveen Seshadri, Query Processing in Device Database System, Cornell University, 26 pages total.

Haym Hirsh, Chumki Basu, and Brain D. Davision, Learning to Personalize, Recognizing Patterns of Behavior Helps Systems Predict Your Next Move, Aug. 2000, vol. 43, No. 8, Communications of the ACM, pp. 103–106.

Bonnet, et al., "Towards Sensor Database Systems", $2^{nd}$ International Conference on Mobile Data Management, Hong Kong, Jan. 2001.

Borland, "Napster–like Technology Take Web Search to New Level", www.cnet.com, May 31, 2000.

Chung, "Design and Implementation of a Heterogeneous Distributed Database Management", Infocom 1989, Proceedings of the $8^{th}$ Annual Joint Conference of the IEEE Computer and Communications Societies. Technology: Emerging or Coverging, IEEE Ottawa, Ont., Canada Apr. 23–27, 1989, Washington, DC., USA, IEEE Comput. Soc. PR, US, Apr. 23, 1989, pp. 356–362.

Deering, "Multicast Routing in a Datagram Internetwork", Stanford Technical Report, STAN–CS–92–1415, Department of Computer Science, Stanford University, Dec. 1991.

Estrin, et al., "Next Century Challenges: Scalable Coordination in Sensor Networks", ACM MobiCom 99, Aug. 99, Seattle USA.

JavaSpaces™ Service Specification, Version 1.1, Sun Microsystems, Oct. 2000.

Kahn, et al., Next Century Challenges: "Mobile Networking for Smart Dust", ACM/IEEE Int'l Conf. On Mobile Computing and Networking, ACM MobiCom 99, Seattle, WA, Aug. 17–19, 1999.

Lehman, et al., "T Spaces: The Next Wave", Hawaii Int'l Conf. On System Science, 1999.

Liu, "Query Routing in Large–scale Digital Library Systems", Data Engineering, 1999. Proceedings, $15^{th}$ International conference on Sydney, NSW, Australia, Mar. 23–26, 1999, Los Alamitos, CA, USA, IEEE Comput, Soc., US, Mar. 23, 1999, pp. 154–163.

Navas, et al., "Jambalaya: Using Multicast for Blind Distributed Web Searching and Advertising".

Computer Science Department; Rutgers, The State University, Nov. 1998.

Navas, et al., "On Reducing the Computational Cost of Geographical Routing" Technical Report (DCS–TR–408), Rutgers University Computer Science, Jan. 24, 2000.

Qian, et al., "Query Interpolation Among Object–Oriented and Relational Databases", Data Engineering, 1995. Proceedings of the $11^{th}$ International Conference on Taipei, Taiwan Mar. 6–10, 1995, Los Alamitos, CA, USA, IEEE Comput. Soc., Mar. 6, 1995, pp. 271–278.

Stonebraker, et al., "Mariposa: A Wide–area Distributed Database System" The VLDB Journal, Springer–Verlag Publisher, pp. 48–63, 1996.

The Network Simulator—ns2 http://www.isi.edu/nsnam/ns.

Wycoff, et al., "T Spaces", IBM Systems Journal, 37(3):454–474, Aug. 1998.

Zhao, et al., "A Universal Relation Approach to Federated Database Management", Data Engineering, 1995. Proceedings of the $11^{th}$ International Conference on Taipei, Taiwan Mar. 6–10, 1995. Los Alamitos, CA, USA, IEEE Comput. Soc. Mar. 6, 1995, pp. 261–270

* cited by examiner

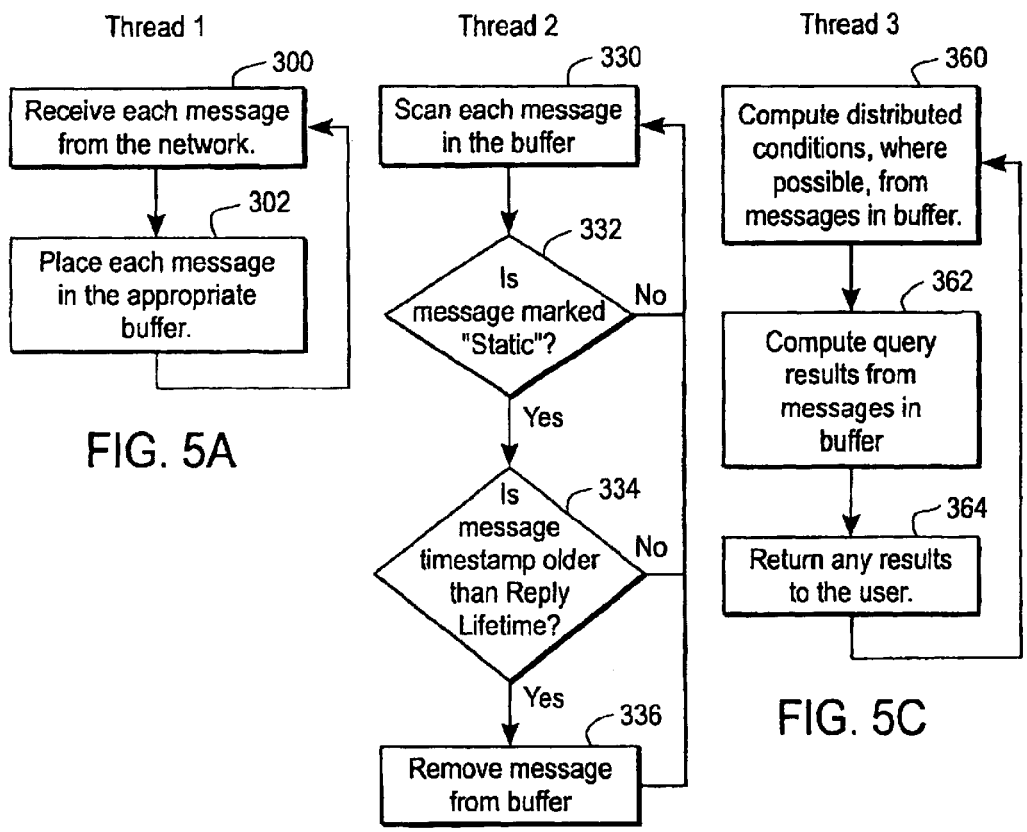

Package (PID, Size, SenderID, ReceiverID, DestStation, DestZIP, Priority, SpecHandling)

Vehicle (VID, Dest, ExpectedWait, Status, VType)

Customer (CID, Name, StreetAddr, City, ZIP)

ConveyedBy (PID, VID)

Station (SID, Name, State, Country, Region)

StoredAt (PID, SID)

FIG. 6

| SELECT | V.VID, S.Name |
|---|---|
| FROM | Vehicle V, Station S |
| WHERE | V.Dest = S. Name |
| AND | S.State = "California" |
| AND | V.ExpectedWait < 60 |

| Group 1: | S.State = "California" |
|---|---|
|  | V.Dest = S.Name |
| Group 2: | V.ExpectedWait < 60 |
|  | V.Dest = S.Name |

FIG. 7

Vehicle.ExpectedWait < 60
Vehicle.Dest > %1
(%1.String) "LosAngeles", "Oakland", "Hayward", "Santa Barbara";
Vehicle.VID
Vehicle.Dest;

FIG. 8

SYSTEM AND METHODS FOR HIGHLY DISTRIBUTED WIDE-AREA DATA MANAGEMENT OF A NETWORK OF DATA SOURCES THROUGH A DATABASE INTERFACE

CROSS-REFERENCE TO RELATED APPLICATIONS

This application claims priority from commonly-owned provisional U.S. patent application Ser. No. 60/275,429 (01P4385US) filed on Mar. 12, 2001. This application also is a continuation-in-part of commonly-owned non-provisional U.S. patent application Ser. No. 09/726,702 (99P7390US01) filed on Nov. 28, 2000 now U.S. Pat. No. 6,778,987.

BACKGROUND OF THE INVENTION

The ability to access particular desired information from a distributed network database system of data sources under a variety of different conditions is desirable. However, conventional systems can experience difficulties in accessing and managing the desired data in some situations.

For example, one difficulty in the current art regarding networks of data sources is how to manage data from the data sources, especially from very large data sources or from a very large number of data sources. Networks of data sources present difficulties for data management, as the data sent by large data sources or a potential multitude of data sources can be overwhelming to the network or data management system used.

Also, it is possible that data sources in the network continually provide information that will change or be updated frequently. In these situations where the data may be dynamic, conventional systems often do not provide any mechanism to dynamically account in the query results for data inputs from data sources added (or removed) at any moment to the network of data sources. Further, in some situations where the data may be less dynamic and more static, conventional systems may not provide the flexibility to account for situations with either dynamic data or static data or both.

Additional difficulties in effecting proper or accurate data management can be encountered when the network has low bandwidth or is unreliable (for example due to the amounts of control overhead that may be needed to be sent over the network) or when a data source is not reachable due to temporary malfunction or other reason.

Accordingly, it is seen that a system and methods for providing more efficient, sophisticated, flexible query capabilities or techniques are desirable for useful data management of data source networks under a variety of circumstances.

SUMMARY OF THE INVENTION

The above discussed problems and disadvantages are overcome by the present invention according to various embodiments. The present invention allows traditional information technology data management techniques to be applied directly within networks of data sources. More specifically, the present invention allows a program, running on a device logically connected to a network that also logically connects the networked data sources, to issue a traditional database query onto the network and to receive back from the network the result of that query as it applies to the data produced by those data sources.

According to a specific embodiment, the present invention provides a method for information management of a distributed data sources network database that includes multiple nodes. The multiple nodes include a querying node and multiple data sources. The method includes the steps of providing a schema for the distributed data sources network database, and entering a query in a database language at the querying node in the network. The method also includes steps of decomposing the query into at least one network message including a particular set of a table name, a table attribute and a value, transmitting the network message to data sources relevant to the particular set of the table name, table attribute and value in the query, receiving at least one reply message from the data sources relevant to the particular set of the table name, table attribute and value of the query when the query is met, and providing a query result in the database language at the querying node from the at least one reply message. In other similar specific embodiments where the schema is, for example, an object-oriented schema, the table name and table attribute mentioned above would be substituted by a class name and class attribute.

According to another specific embodiment, the present invention provides a method for information management of a distributed data sources network database including multiple nodes. The multiple nodes include a querying node and multiple data sources. The method includes steps of providing a schema for the distributed data sources network database, entering a query in a database language at the querying node in the network, and decomposing the query into at least one network message. The schema provides a list of attributes or tables which are locally joinable, and the query includes multiple predicates. The method also includes steps of transmitting the network message to data sources relevant to the multiple predicates of the query, receiving from the data sources relevant to the query a reply message to the network message in which those predicates of the query which are included in the list of locally joinable attributes or tables are locally joined at the data sources, and providing a query result in the database language at the querying node from the reply message.

According to another specific embodiment, the present invention provides a method for information management of a distributed data sources network database that includes multiple nodes. The multiple nodes include a querying node and multiple data sources and multiple archive nodes representing particular data sources. The method includes steps of providing a schema for the distributed data sources network database, entering a query in a database language at the querying node in the network, decomposing the query into at least one network message, and transmitting the network message to data sources relevant to the query. The method also includes steps of receiving from the network a list of successfully accessed data sources, retransmitting the network message to the archive nodes and to the data sources on the list, receiving a reply message from the data sources from the list and from the archive nodes representing those data sources that match the query but are not on the list, and providing a query result in the database language based on the reply message.

These and various other specific embodiments of the present invention and the features and advantages of the invention will be described in more detail below with reference to the accompanying drawings.

BRIEF DESCRIPTION OF THE DRAWINGS

FIGS. 5A–5C show functional descriptions for collecting network messages and interpreting query results, in accordance with specific embodiments of the invention.

FIG. 6 shows a simplified data schema that might be used for a postal logistics application, according to a specific embodiment.

FIG. 7 shows an example of a query with a non-local join and the predicate groups generated, according to a specific embodiment of the present invention.

FIG. 8 shows the possible text of message 2, where % 1 indicates a placeholder for which the data listed is to be substituted, according to the example of FIG. 7.

DETAILED DESCRIPTION OF SPECIFIC EMBODIMENTS

Figure 1:
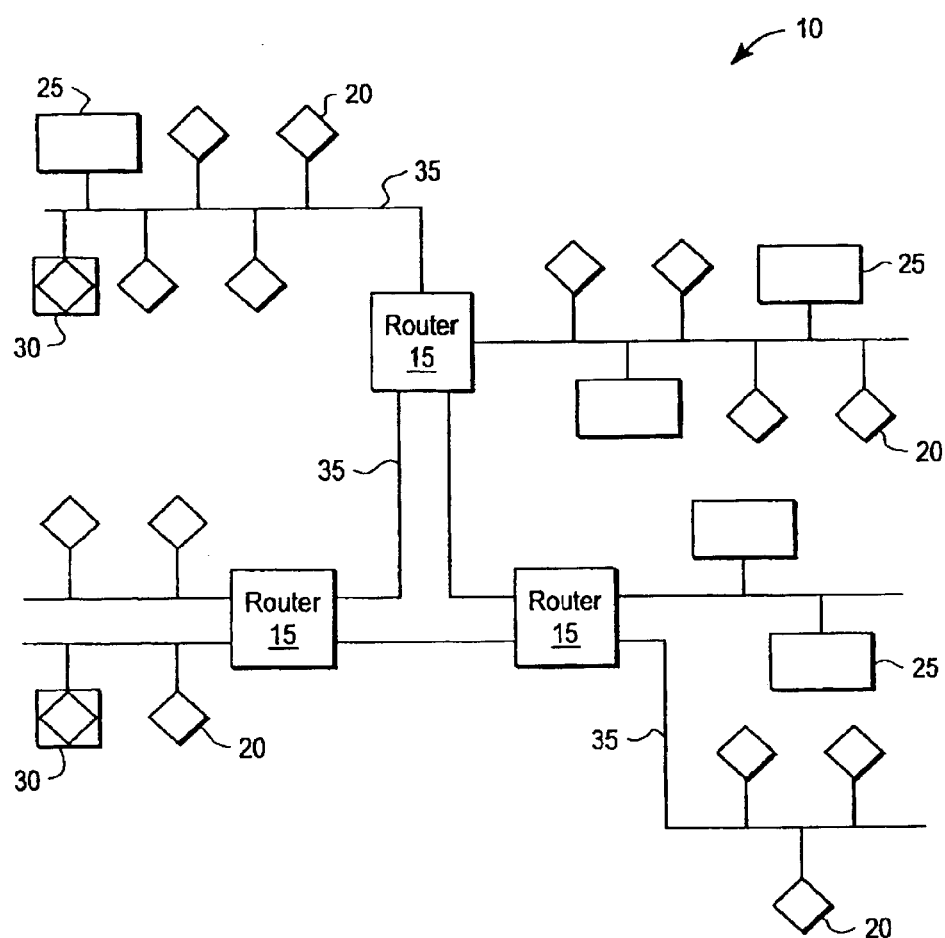
FIG. 1 shows an example of a network architecture in which the present invention may be employed.

I. The General System
  A. Querying Node Translating Query into Network Messages
  B. Routing Over Network of Network Messages
  C. Network Interface Response to Network Messages
  D. Reply Message Processing and Query Result Production at Querying Node
  E. Ending Refreshing Queries
II. Data Table Joins
  A. Local Joins
  B. Non-Local Joins
  C. Designated Join Nodes
  D. Designated Query Nodes
III. Achieving Event-based Capability by Pushing Declarative Functionality
  A. Distributing Data Management Functionality
  B. Installation of Data Source Functions
  C. Ending Refreshing Queries
IV. Handling Unreachable Data Sources
V. Conclusion
I. The General System According to specific embodiments, the present invention includes a system that describes a network of data sources in terms of a traditional database schema, converts traditional database queries into network messages, and routes those messages to those data sources which have relevant data. In the present invention, the network interface of the data source accepts the message, filters the data source's output according to the instructions in the message or extracts information relevant to the query from the data source according to the constraints and/or instructions in the network message, and then sends reply messages with relevant information to the originator of the query. The system then collects these reply messages at the query originator and produces query results as a traditional database. Although the present invention is novel in its support of data sources with limited processing power according to specific embodiments, it is also appropriate according to other specific embodiments for applications where data sources have more significant processing power, as they may draw on the other advantages of the system.

The present invention provides a system and methods, which allow a network of data sources to be managed by multiple distributed clients as if the network of data sources were a single database. More specifically, the invention allows a program running on a networked device to issue a database query to its network interface, and for the network infrastructure to calculate the results of the query and return these results to the querying device. Specific embodiments of the present invention will be useful for information management in many different applications. Specific applications are in industrial automation such as factory equipment control and management, and parcel tracking in logistics management, as described below for exemplary purposes. However, other specific embodiments will be useful for, crisis management for toxin tracking or fire tracking, highway traffic management, security management, smart building or smart battlefield applications, supply chain management and execution, remote field maintenance, utility grid management, operational data stores, general enterprise data integration, and many other applications.

As will be discussed in more detail below, some of the advantages offered by this invention include: allowing users or programs to access and process data from networked data sources according to well known information technology standards, including but not limited to the Structured Query Language (SQL); allowing multiple users and programs to access and process data source data from any point in the network; significantly reducing network traffic compared to polling or continuous-refresh systems; having no central point of failure for data access; having minimal latency, as data always travels the direct path from the data source to the requesting node; and not being necessary for the querying node to know the physical locations of the responding data sources.

FIG. 1 shows an example of a network architecture in which the present invention may be employed. One skilled in the art will recognize this as an internetwork 10, that is, a collection of networks connected by network routers 15, which may be interconnected to each other. The term router is used herein in a general sense and may include traditional routers, network switches, gateways, bridges, or controllers bridging separate networks. The present invention may also be used on a single network, but its value is higher on an internetwork. Each network may connect an arbitrary number of nodes. The lines 35 connecting various nodes and routers in this network architecture are wired connections, in this specific embodiment. Another architecture on which the present invention may be employed is a wireless network. This differs from the network described above for FIG. 1 in that there are no direct connections between nodes, but rather data in communicated by wireless techniques to proximate nodes given the range of transmission, and possibly line of sight restrictions. Accordingly, in these specific embodiments, lines 35 can be viewed as logical connections for a wireless internetwork. Further, in embodiments where the internetwork includes a combination of wireless and wired networks, lines 35 are logical connections and wired connections respectively. Those familiar with the art will recognize that there are many algorithms for varying the transmission range and rate to make more efficient use of bandwidth and power consumption. Moreover, those familiar with the art will recognize that there are many algorithms used to connect and reconnect mobile or dynamic nodes, called ad-hoc networking. The architecture of such networks is not fixed. The present invention is compatible with any such approaches.

According to the present invention, each node on the network has a network interface and queries may originate from any data consumer node in the network. A network node may be a data producer 20, a data consumer 25, or both (a data producer/consumer 30). Examples of data producers (or data sources) 20 include a sensor; a business process application (such as an Enterprise Resource Planning System), a data source bank (often called a distributed I/O); a traditional database (such as a relational database); a data warehouse (such as a data mart or database cluster). Examples of data consumers 25 include controllers and monitoring systems. Examples of nodes that are data producer/consumers 30 include a user operator panel, a user graphical interface, or an application program. For purposes of the present invention, a controller acting as the interface to the network for one or more data sources is considered a single node which is another example of a data producer/consumer 30. Any node in the network can be equipped with the functionality of a data consumer node, a data producer node, or a data producer/consumer node by embedding the appropriate software, in accordance with the present invention, in the node. However, not all nodes in the network need to be equipped with software according to the present invention in order for the present invention to operate.

As mentioned above, each node (including each data source) on the network has a network interface, appropriate for the type of network protocol used on the network to which that node is logically connected. This network interface includes the relevant traditional network interface protocols, of which examples include but are not limited to: Ethernet, IP, TCP, UDP, Profibus, DeviceNet, and wireless protocols such as IEEE 802.11, Ricochet, GSM, CDMA, etc. These protocols enable the network interface to receive a message from the network. Additionally, the present invention provides an extension to the data consumer's network interface and to the data producer's (e.g, data source's) network interface. In particular, each nodes' network interface includes software, in addition to the typical network protocol interface, that provides the functionalities of the present invention, as will be described in more detail below. In a specific embodiment, this additional software preferably is embedded (stored in memory such as ROM) in the network interface of the node (e.g., data consumer node, data producer node, or data producer/consumer node); or in the application resident on the node (e.g., data consumer node, or data producer/consumer node); or in a separate software process resident on the node. In another specific embodiment, such as when the data source is preferably left undisturbed, the additional software can run on separate hardware that is connected to the data source by a local area network or direct point-to-point connection.

The present invention provides for a description of the network of data sources in terms of a traditional database schema. With this database schema, the nodes on a network view the data sources (e.g., data producer 20 or data producer/consumer 30) on the network as a "database." Traditionally, in a relational database, a schema is understood to mean tables, each of which has columns (each column corresponding to attributes of relations) and rows (each row corresponding to a relation grouping called a tuple). In an object-oriented database, a schema is traditionally understood to mean a set of object classes, which may form a hierarchy from general to specific. Classes are understood to include class attributes. Note that XML databases are equivalent to object-oriented databases for purposes of interacting with the present invention. They also have data classes (called tag types) containing attributes and values. Either a relational or object-oriented philosophy with a schema may be followed within the framework of the present invention.

To view a network of data sources as a relational database, a table is made in the schema for each data source type. The attributes of this table include (1) each of the output types which the data source can provide, (2) attributes for descriptive information about the data source (e.g. the ID of a component which it is connected to, ID of the subsystem to which it belongs, etc.) and (3) an ID. This last ID is unique within the table for each data source in the listed in the table. If some data source types are similar but slightly different, they may be merged into a single table with extra attributes to distinguish between the types.

Alternatively, in a preferred approach for data sources that have for example significant data stored within, a single data source may contain parts of several tables. In those cases where the local schema of the data source differs from the global schema of the network of data sources, the data source software may provide translation of the query between the global and local schemas. Additionally, the data may need to be translated from the normalized version used by the global schema to the local vernacular of the data source and vice versa. For instance, if a data source is a computer on a delivery truck, it might contain an entry in the truck table, with attributes describing its destination, status, speed, etc., and it might also contain entries in a merchandise table, which include one entry for every piece of merchandise that the truck was carrying.

To view the network of data sources as an object-oriented database, an object class is defined for each data source type. Alternatively, in a preferred approach for data sources that have for example significant data stored within, a single data source may contain several object classes. One skilled in the art will recognize that if some data source types are similar but slightly different, they may be represented as subclasses of a common, more general class. Methods are included within each class to allow retrieval of the data source data, such as one method for each output type of the data source. Additional methods are included to retrieve descriptive information about the data source (e.g. the ID of a component which it is connected to, ID of the subsystem to which it belongs, etc.). Additional methods may be included to access special functions of the data source, such as reset, calibration, setting the dynamic range, etc. (for example in a sensor network application).

As mentioned above, the present invention may view the network of data sources with a schema from either a relational or object-oriented philosophy. For clarity in understanding the invention, the following description will be describe the invention from a relational database philosophy, in accordance with a specific embodiment. It is understood that other specific embodiments of the present invention from an object-oriented philosophy (including XML databases) are also within the scope of the present invention. Further, some databases have a schema using a combination of relational and object-oriented philosophies, and these types of databases also are within the scope of the invention.

It is an aspect of the present invention that the entire database schema need not be explicitly stored at any node. Each querying node need only know the table and attribute names of the data that it requires, and not the entire global schema. The schema of the database is implicit from the behavior of the system, as is further described below. However, if data sources contain traditional relational or object-oriented data, it is useful to provide a mapping from the local schema to the global schema. Since the global schema may change, an optional improvement to the system in such cases is a mechanism for automatically deploying the global schema and mapping. An appropriate mechanism for this is described below in the section "Distributing Data Management Instructions".

Figure 2:
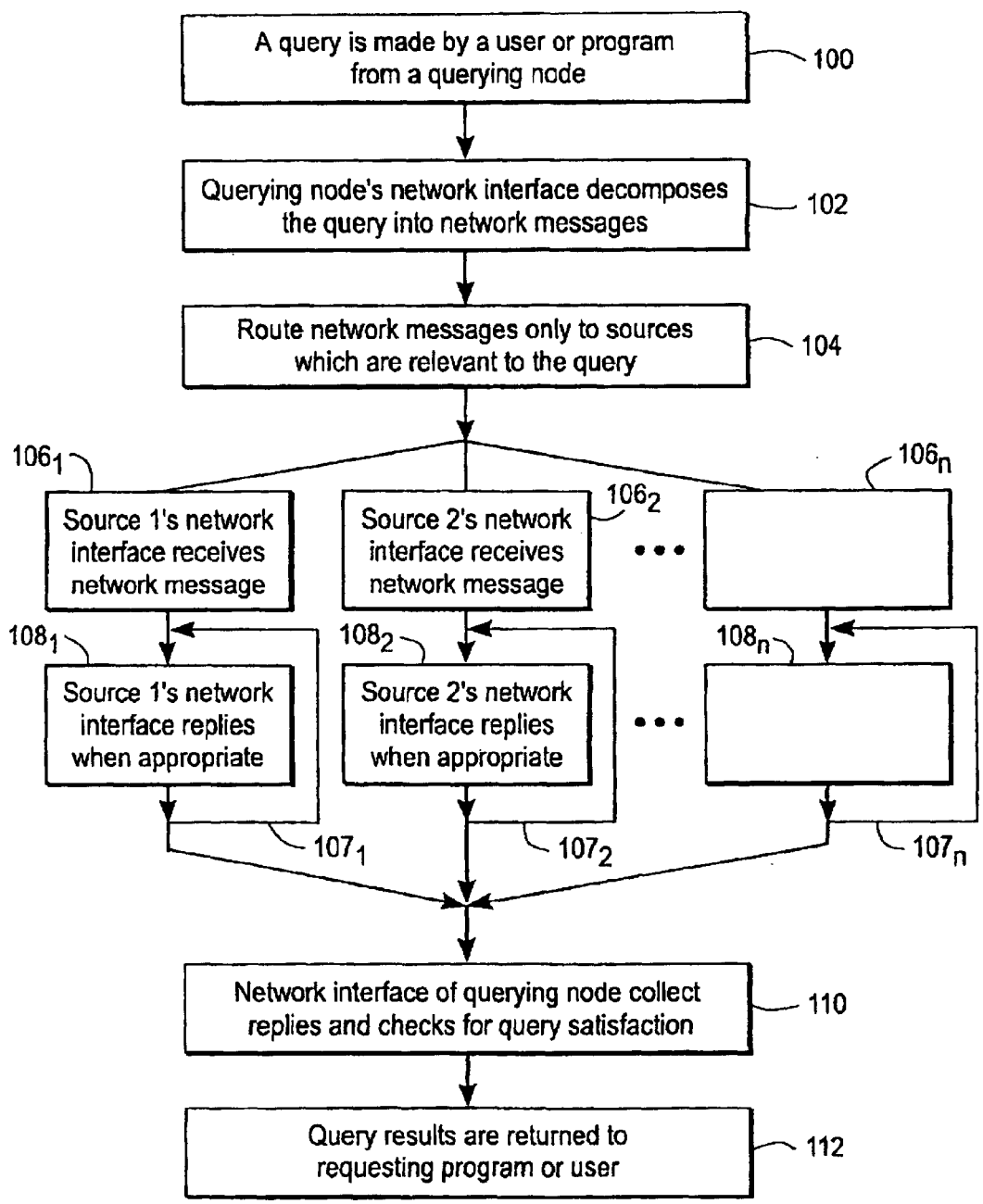
FIG. 2 shows a general functional description of a specific embodiment of the invention.

Once a schema has been designed, the present invention generally operates according to FIG. 2. Each of these steps is described in more detail later in this document. Any data consumer node 25 or 30 in the network may issue a traditional database query in a step 100. According to a specific embodiment, queries may specify a "refresh rate" which indicates that the query is to persist and be continually evaluated against the current network status at a given rate. In a step 102, that query is decomposed into the relevant parts for each data source type by the network interface of the querying node into network messages. Each network message is then routed over the network only to the data sources of the appropriate type by the routing system, in a step 104. In some cases, the network routers 15 may also route the network messages based on constraints from the query in addition to based on data source types. In a step 106, the network messages are received by each of the appropriate data sources' network interfaces. If necessary, the data source network interface converts the query from the global schema to the local schema. Each data source's network interface checks the constraints of the query periodically according to the refresh rate of the query, as indicated by a feedback line 107. When the constraints are satisfied, the data source's network interface replies to the query, in a step 108, and the reply is routed back to the querying node. In a step 110, the network interface of the querying node collects the replies and continually checks them for query satisfaction. Each time the query is satisfied, the network interface passes the relevant data to the querying program or user in a step 112.

A. Querying Node Translating Query into Network Messages

As mentioned above, the present invention provides a system to convert traditional database queries into network messages that are appropriate for a network of data sources in which each data source is viewed as one or more database records (relational model) or object instances (object-oriented model) or some combination thereof, and in which the schema described above is used. This system extracts the relevant parts of the query for each data source, so that it may be sent to the data source. In particular, each data consuming node 25 or 30 includes either in its network interface or in the application program resident on that data consuming node the necessary software/firmware that converts traditional database queries into network messages containing the relevant parts of the query to be sent to the appropriate data producing node 20 or 30. This network messaging software includes the functionality of extracting the relevant parts of the query and then including these parts into a message encapsulated in the data payload of a typical network protocol packet (e.g., within an Ethernet packet payload, etc.) transmitted over the network.

The present invention moreover extends traditional database queries with an optional additional specification, in accordance with a specific embodiment. Queries may specify a "refresh rate" which indicates that the query should be continuous and should be updated at the rate given. Note that even if a refresh rate is given, queries are only answered when the query constraints are satisfied, as is described in detail later.

In accordance with a specific embodiment, the relevant parts of the query for each data source are: (1) a list of constraints, possibly empty, based on which the data source should decide to send information, (2) a list of return values which the data source should return if the constraints are satisfied, (3) optionally, a refresh rate at which the data source should reconsider sending the information, (4) a unique message ID, and (5) the address of the querying node. The address of the querying node may be omitted if it is automatically provided as part of the underlying network service. These parts form a network message for each data source involved in the query. The exact structure (e.g., order and/or size of the fields containing the above relevant parts of the query) of the network message, although it should be predetermined in the system, is not crucial to the invention. The network message may be sent using one network protocol packet, or the network message may be broken into segments that are sent using multiple network protocol packets.

Figure 3:
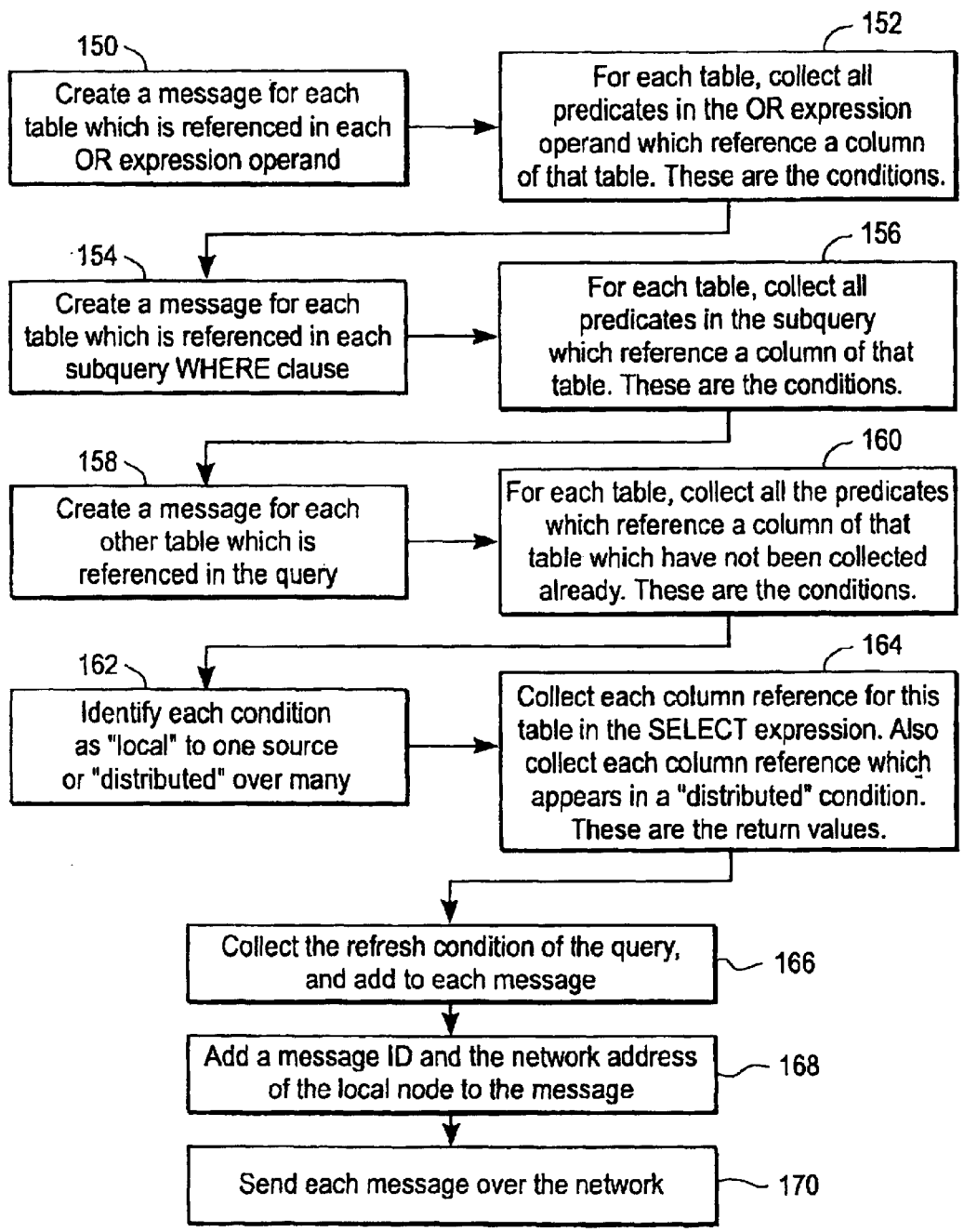
FIG. 3 shows a functional description for translating a database query into network messages, in accordance with specific embodiments of the invention.

FIG. 3 describes a system for decomposing SQL queries into the network messages described above, in accordance with a specific embodiment. The present invention is not limited to SQL as the query language. SQL is practically the standard query language for relational databases and is also being used increasingly with object-oriented databases. As the leading database query language at this time, SQL serves as an appropriate illustration of the decomposing technique of the present invention. Also, as mentioned above and emphasized herein, this description of decomposing traditional database queries into network messages in accordance to a specific embodiment of the invention is described in the context of relational database approach, but should not be so limited. The specification of constraint predicates is a significant portion of most query languages, and extracting the predicates based on relational tables referenced (or referenced classes, in an object-oriented case) can be performed for these other query languages in accordance with the present invention. Most other query languages also allow OR expressions or subqueries, and they are handled similarly as described below for SQL.

As shown in FIG. 3, in accordance with a specific embodiment of the present invention, the system for converting the traditional database query into network messages that are sent by the querying node over the network begins by creating the necessary messages.

In a step 150, one message is created for each table which is referenced within each operand of an OR expression, in the WHERE clause of the query or any subquery expression. Within the operand of the OR expression, each predicate that refers to a column of the table is included in the message as a constraint, in a step 152. (Prior to step 150, the WHERE clause of the query and each subquery is converted to disjunctive normal form, the procedure for which is well-known in the art.) Next, a message is created for each table which is referenced outside an OR expression, but which is within the WHERE clause of a subquery expression, in a step 154. All references to columns of that table which are within the WHERE clause of the subquery, but not already included in other messages, are then included in the new message as constraints, in a step 156. Next, a message is created for each table that is referenced in the WHERE clause outside any OR expression and outside a subquery expression, in a step 158. All predicates that reference columns of this table, but have not yet been included in other messages, are then included as constraints in this message, in a step 160.

In a step 162, for each constraint in each message, this constraint is identified as either "local" to one data source or "distributed" over many data sources. This is achieved by counting the number of tables which are referenced in the constraint. If it is 1, then the constraint is "local." If it is 2 or more, than the constraint is "distributed."

For each message, in a step 164, the system collects all of the columns in the SELECT expression which reference the table for which the message has been created, and adds to this list each column that references this table and occurs in a "distributed" constraint of the message. This list is added to the message as the "return values" for the message. The "distributed" constraints are then removed from the message's constraint list.

Next, for each message, if a refresh rate was specified in the query, the refresh rate is included in the message, in a step 166. Then, the system includes a unique message ID and the network address of the local querying node to the message, in a step 168. The system then sends each message over the network in a step 170.

Therefore, a simple exemplary query (such as for a factory automation environment where the location of those containers meeting certain requirements are requested to be selected) that is in the form of SELECT location from container:

WHERE (predicate1)

where predicate1 could be "Temp>100 degrees", would be sent translated into a network message with predicate1 with a unique message ID and the network address of the querying node. Another exemplary query in the form of:

WHERE (predicate1 AND predicate2)

where predicate2 could be "Pressure>100 psi", would be sent translated into a network message with predicate1 and another network message with predicate2, with both network messages having the same message ID and the network address of the querying node. Yet another exemplary query in the form of:

WHERE (predicate1 OR predicate3) where predicate3 could be "Volume<250 cubic cm", would be sent translated into a network message with predicate 1 and another network message with predicate3, with both network messages having the same message ID and the network address of the querying node.

Additional optimization is possible based on elimination of common sub-expressions, which is well-known in the art, according to other specific embodiments.

B. Routing Over Network of Network Messages

Once a query has been converted into a collection of data source-relevant network messages, these messages must be sent to the data sources for satisfaction. In order to achieve this without requiring a central database of the data source addresses, the network routers need to understand how to route messages based on the data source descriptors (e.g., tables, classes, attributes, values) referenced in the message. A string-based message routing method is needed so that network messages are routed only to those data sources which are relevant to the particular query made.

In some embodiments, especially those where data values are extremely dynamic, data types (such as table, class, or attribute names) are used as descriptors of the relevant data sources. In other embodiments, especially those with less dynamic data values, it is preferable to more finely route messages and thereby reduce data traffic. This is achieved by choosing data values (along with the associated type information such as attribute and table or class names) as routing keys, according to a specific embodiment. For example in the package delivery application, instead of routing a message querying about a particular package which is supposedly being sent to Berkeley, Calif. from southern California to all TRUCKS (a table (or class) name), the message might be routed more specifically to TRUCKS.DESTINATION= "Berkeley". This reduces the total traffic on the network significantly, since such trucks are likely to be located topologically nearby to one another.

The preferred technique for implementing string-based message routing in specific embodiments of the invention is characteristic routing, as described in detail in commonly-owned U.S. patent application Ser. No. 09/728,380 entitled "Characteristic Routing," filed Nov. 28, 2000, and incorporated herein by reference. Characteristic routing is a routing protocol that allows data to be transported multi-hop through a network from a sender node to a set of nodes using an arbitrary mix of "characteristics" (characteristics are descriptions of the nodes in the form of multiple arbitrary identifying descriptive names). Nodes can have multiple, dynamic characteristics. Characteristic routing is optimized to make routing using multiple characteristics fast and efficient by creating a routing table index using bit vectors and compression techniques. Using characteristic routing as the index for the networked objects (e.g., data sources) being queried provides an efficient indexing means for fast and efficient information retrieval from a distributed network of data sources database. In particular, characteristic routing eliminates the need to individually contact data sources or to create predefined multicast groups in order to query the data sources relevant to a query. Characteristic routing provides a bit vector representing the particular characteristics for each node, where each bit location in the bit vector represents the existence of a particular characteristic out of a set of total characteristics for a node. Network messages sent using characteristic routing can be directed to data sources that have the information requested in the query.

An alternative technique, although less efficient, is to use Internet Protocol multicast (IP-multicast) for message routing, and to assign each data source descriptor to be a particular multicast group. The advantages of characteristic routing relative to IP-multicast routing are described in more detail in the above-referenced patent application.

Routers 15 in the network will be equipped appropriately to perform the particular descriptor-based message routing that might be utilized in specific embodiments. Accordingly, the network messages are routed only to those data producers 20 or 30 which meet the defined descriptor relevant to the query.

C. Network Interface Response to Network Messages

Figure 4:
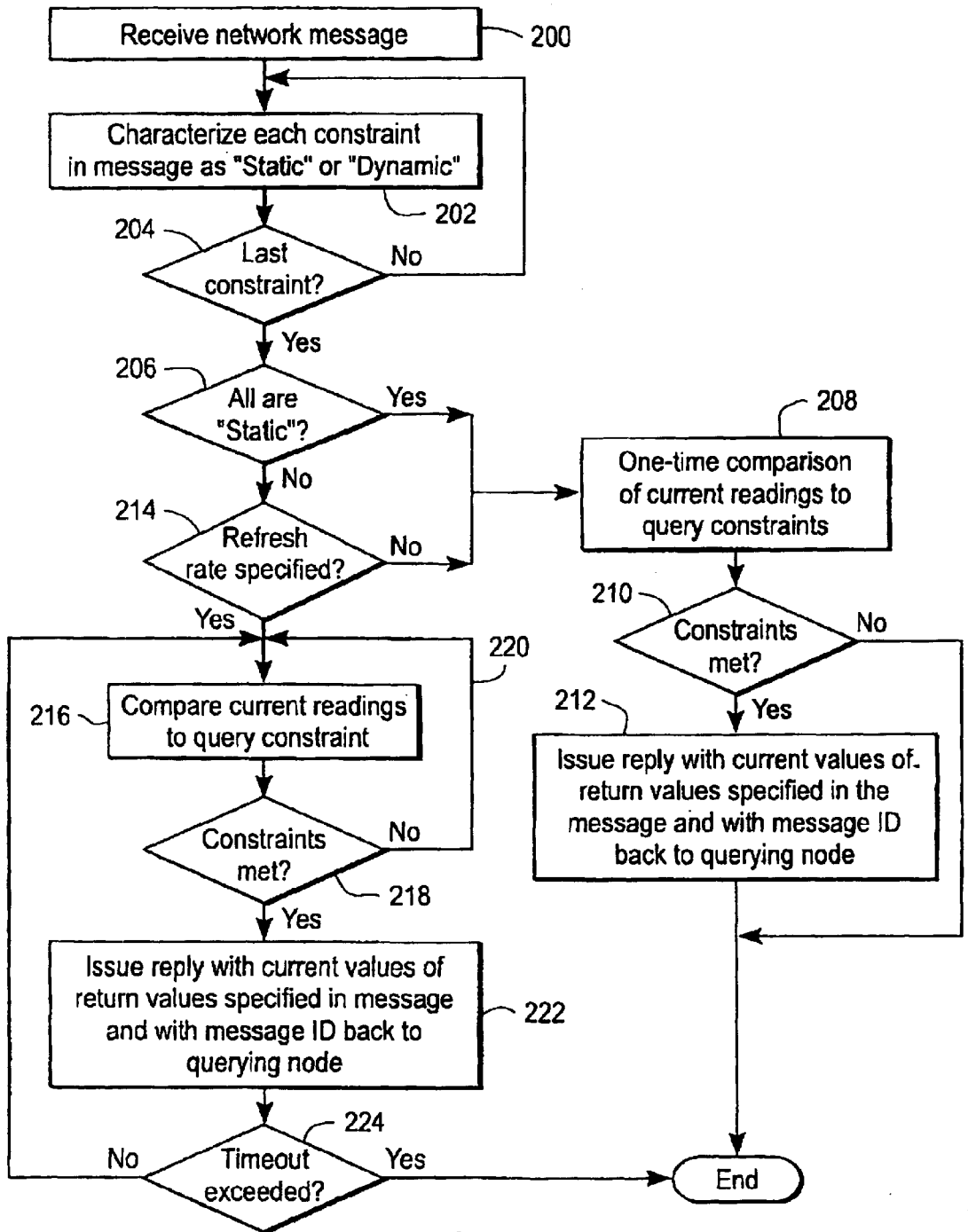
FIG. 4 shows a functional description of a network interface processing network messages received, in accordance with a specific embodiment of the invention.

The present invention also extends the functionality of each data source's network interface so that the data source can respond to network messages appropriately, as discussed in the following with regard to FIG. 4. In particular, each data producing node 20 or 30 includes either in its network interface or in the application program resident on that node the necessary software/firmware that processes received network messages and transmits response messages back to the appropriate querying node when the query constraints are met. The response messages are encapsulated in the data payload of a typical network protocol packet (e.g., within an Ethernet packet payload, etc.) that is transmitted by the data producing node 20 or 30 over the network. As seen in FIG. 4, when a message of the form described above is received in a step 200 by a data source that meets the defined type relevant to the query, the data source's network interface adds the message to its list of outstanding queries (for example in a buffer).

In a specific embodiment in which the global and local schemas differ, each constraint in each message is converted to the local schema. A preferred embodiment of this step is to have the local and global schemas available as XML documents, and a mapping between them as an XLST document. One familiar with the art will recognize that XSLT documents define mappings between XML documents.

For each network message in the list of outstanding queries, the data source's network interface characterizes each constraint in the message as either "static" or "dynamic," in a step 202. This characterization is achieved by considering all of the column references in the constraint. Each data source maintains a list of which attributes are considered "static" and which "dynamic", based on the frequency with which the value of that attribute changes. The network interface determines in a step 204 if the previously-characterized constraint is the last constraint in that message. If not, then the system returns to step 202 to characterize the next constraint in the message.

Once the last constraint in the message is characterized, the data source's network interface determines in a step 206 whether all the constraints in the message are "static." If all the constraints in the message are determined to be "static," then the network interface in a step 208 performs a one-time comparison of the current readings of the data source to the query constraints. If the current data values meet the query constraints, as determined in a step 210, then the network interface issues back to the querying node a reply message that includes: the current values of the return values specified in the processed network message, an indication that the constraints were "static," and the unique message ID of the processed network message. The reply message, which includes the address of the replying node and is addressed to the querying node, gets transmitted by the data source's network interface over the network for routing back to the querying node.

If the determination is made in step 206 that not all constraints were "static," but rather included at least one "dynamic" constraint, then the system determines in a step 214 whether a refresh rate was specified in the network message. If a refresh rate is not specified, then the network interface proceeds to step 208 and performs a one-time comparison of the data source's current readings to the query constraints. The system then executes the remaining steps 210 and 212, in a similar manner as already described above.

If the determination is made in steps 206 and 214 that the message included at least one "dynamic" constraint and a refresh rate was specified in the network message, then the network interface compares the current data source readings to the query constraints in a step 216. If the constraints are determined in a step 218 not to be met, then the network interface returns (as indicated by line 220) at the specified refresh rate to step 216 to compare the current data source readings to the query constraints. If the constraints are determined in step 218 to be met, then the network interface in a step 222 issues back to the querying node a reply message that includes: the current values of the return values specified in the processed network message, and the unique message ID of the processed network message. The reply message, which is addressed to the querying node, gets transmitted by the data source's network interface over the network for routing back to the querying node. If the value of a predetermined lifetime parameter that optionally may be specified in the network message has been exceeded, as determined in a step 224, then the network interface ends its processing of the message. However, if this value has been determined in step 224 not to be exceeded, then the network interface returns to step 216 to make another comparison at the specified refresh rate. The system then continues on from step 216, as already described above.

D. Reply Message Processing and Query Result Production at Querying Node

FIGS. 5A–5C describe the functionality of the present invention for collecting reply messages and producing the query results at the querying node. The system, which can be software running in a client application resident on the querying node or embedded in memory in the network interface of the querying node, has three logical threads, which may be implemented as actual separate threads or as a single monolithic process.

As seen in FIG. 5A, the first thread is responsible for collecting the reply messages from the network. In particular, each reply message is received from the network in a step 300. Each reply message is then placed into the appropriate buffer in a step 302. Separate buffers, indexed by the different message IDs, are maintained for each of the original network messages (each having its own message ID) sent by the querying node. Based on the message ID stored in the reply message, the reply is added to the relevant buffer. A timestamp is added to the reply message to indicate the time at which it was received. Note that multiple queries may originate from the same node, so this thread accepts reply messages relevant to different queries from this node.

The purpose of the second thread shown in FIG. 5B is to enforce the timing constraints of the system. This thread includes a timing interval, called ReplyLifetime, after which any reply message is to be removed from its buffer. The value of the ReplyLifetime is to be determined on a case-by-case basis, but a reasonable default value can be three times the refresh rate of the relevant query. This thread continuously checks though all of the buffers looking for any reply message which was received at a time greater than ReplyLifetime units ago. If any such message is found, it is deleted from the buffer, unless it is marked as "static" in which case it is unchanged. In particular, for each buffer, each reply message is scanned in a step 330. A determination whether a reply message is marked "static" is made in step 332. If the reply message is not "static," then the system continues on to scan the next reply message in step 330. If the reply message is marked "static," then a determination is made whether the message timestamp is older than the ReplyLifetime value in a step 334. If not, then the system continues to scan the next reply message in the buffer in step 330. However, if the timestamp message is older than the ReplyLifetime value, then that reply message is removed from that buffer. Accordingly, those reply messages that are marked "static" and are older than some predetermined time that exceeds a desired threshold are deleted.

The third thread, as illustrated in FIG. 5C, continuously evaluates all of the queries that have been issued from this querying node. It uses the reply messages in each buffer to check for the satisfaction of query constraints that involve data from more than one data source. In database terminology, these predicates are called "joins." For example, if a query included a predicate such as "A.PartID= B.PartID", where A and B are data source types, this condition would be evaluated by this thread whenever reply messages to network messages including this constraint were received. An alternative is to "unfold" the join as is described in a later section. Whenever a set of reply messages exists within the buffers which completely satisfies a specific query, then the values corresponding to the SELECT clause of the query are returned to the program or user which issued the query. The values returned are the query result.

E. Ending Refreshing Queries

In accordance with a specific embodiment, queries for which a refresh rate has been specified continue until terminated. Any node may terminate a query by sending a special "terminate_query" message to each data source meeting the data source-type referenced in the query. This termination message includes the message IDs of the network messages to be terminated. The data source's network interface then removes the network message from its list of outstanding queries. Optionally, as was discussed earlier, a lifetime may be assigned to a query, so that the network interface of each data source will automatically delete any network messages after their lifetime has elapsed.

At the time that a query is terminated, the querying node also erases any reply messages relating to that query which are still in its buffers. The reply messages to be erased would also include any reply messages marked as "static."

II. Data Table Joins

When the database query spans more than one table in the global schema, then the data from the tables should preferably be "joined" together along a set of common key values so that the query constraints can be applied to the combined tables. In some specific embodiments, because of the distributed nature of the data, the data from the tables being joined may have to be gathered from multiple data sources to a central point before being joined. This central point should be as close to the information sources as possible to decrease the amount of network traffic needed to transport the data for joining. In specific cases, where the data tables being joined are always co-located on the data sources, the joins can take place at the data sources themselves.

A. Local Joins

According to some specific embodiments, for example when the data sources may have significant data stored therein, because several tables may be present at a single data source (e.g., a delivery truck data source includes entries for a truck table and a merchandise table), data traffic may be reduced if certain join operations can be designated as "locally joinable." "Locally joinable" means that the join can be done at the data source before the data is transmitted. In general, if data is provided from several sources, joins preferably should not be performed at the sources, due to the possibility of filtering out records that would otherwise correctly join with records from other sources. However, the semantics of a particular schema may indicate that certain joins can be performed at the sources without fear of loss of information.

FIG. 6 shows a simplified data schema that might be used for a postal logistics application. In a typical postal logistics application, there may be on the order of 50,000 data sources (e.g., tertiary containers like trucks, airplanes, stations, etc.) with the data sources autonomously adding or removing themselves from the system at any time. In such applications, electronic information about a particular package moves with that package, such as using RF-ID tagging or other known techniques. Using the present invention, a large courier service for example could treat its distribution and staging system of hubs, substations, trucks, and airplanes as a single "live" networked database of packages, with an authenticated client from any point in this network being able to issue a query against this database and receive the current answer in response to the query. Each table is distributed, storing the data along with its physical manifestation. In this example, Vehicle and Station records are stored at the location of the vehicle or station. Package records are stored at the site of the package, either vehicle or station. Customer records are associated with packages, and are stored with them. ConveyedBy and StoredAt tables are stored with the corresponding vehicle or station.

In the example schema of FIG. 6, the Vehicle and ConveyedBy tables are an example of a pair of locally joinable tables. The semantics of the system dictate that all records of a ConveyedBy table that correspond to a particular Vehicle.VID are located at the same data source (the vehicle) as the Vehicle record for that Vehicle.VID. If a join is requested on these two tables, the join can be performed locally at the vehicle data source, without fear that records will be lost which might be joinable elsewhere.

According to some embodiments, it is further possible that certain attributes of a pair of tables will be locally joinable, even if not all attributes of those tables are locally joinable. In the postal schema of FIG. 6, for example, Package.ReceiverID is locally joinable with Customer.CID, because a Customer record describing the receiver of a package travels with each package. However, Package.DestZIP is not locally joinable with Customer.ZIP. To illustrate this, consider a query that tries to find the names of all customers who live in the same ZIP that a package is destined for. This query would typically involve a join on the ZIP attributes. There may be many customers who live in this ZIP code, and they will not all be recorded in a given truck. Thus a join on the ZIP attribute cannot be conducted locally, or many potential matches would be overlooked.

In order to allow optimization of a query based on local joins, in accordance with a specific embodiment, the specification of the schema is extended to include local join relationships. All joins are assumed not to be locally joinable unless identified through the use of this extension. The syntax allows either pairs of complete tables, or specific pairs of table attributes to be designated as locally joinable:

join_locally_statement->join_locally table, table |join_ locally table.attribute, table.attribute;

Accordingly, if one or more operations in a query are processable as local joins at a data source, then the amount of data sent back over the network to the querying node from that data source can be minimized.

B. Non-Local Joins

Non-local joins are any joins that cannot be resolved locally at a data source. With non-local joins, the records to be joined are coming from multiple data sources.

In some specific embodiments, such as in the case of data sources with large quantities of data, the system unrolls the join in ascending order of the expected query result size. Rather than gathering all of the data and then joining it at the querying node, in these specific embodiments, the system can choose to "unfold" the joins, that is to gather the records from one table, and use that to filter the data coming back from the other table. This approach also makes a selection in the first step that reduces the number of records transmitted. It is noted that this reduction in the number of records transmitted can be especially useful when the network logically connecting the data sources has bandwidth limitations or the network tends to be unreliable.

FIG. 7 shows an example of a query with a non-local join, and the predicate groups generated, according to a specific embodiment. Note that the join predicate (V.Dest=S.Name) appears in both groups, since it involves both tables. When this query is resolved, the join is unfolded in the following way. When message 1 is sent, the join predicate is removed, and S.Name is requested as a return value. The S.Name data is collected, and is included in message 2. Data sources only reply to message 2 if they have data that will satisfy the join predicate given the included return value data. Unfolding the joins in this manner acts as a very coarse filter on replies, and significantly reduces the network traffic generated as a result of the query. FIG. 8 shows the possible text of message 2, where %1 indicates a placeholder for which the data listed is to be substituted, according to the example of FIG. 7. Data sources interpret this locally like a logical OR of four predicates.

In an alternative embodiment, a bloom filter represented by a bit vector is used within message 2 to represent the S.Name values. The bloom filter can be used to reduce the amount of message overhead necessary to encode the values of S.Name. When the size of the binary encoding of the list of S.Name values exceeds a specified threshold, then a bloom filter whose bit vector representation is less than the specified threshold would be used. In such an embodiment, the values of S.Name can be hashed into the bit vector using one or more hash functions. For each hashing of an S.Name value, a bit is set to one in the bit vector at the position specified by the hash function. When message 2 is sent, in addition to containing a request for the values of V.Dest, the message body would also contain the bloom filter bit vector, the length of the bit vector, and the number of hashes that were used to encode the values. When a data source receives message 2, it extracts all of the rows that match the query constraints. It then compares all of the response values for V.Dest against the bloom filter in the message. It does so by hashing the V.Dest values using both the same hash functions and the same number of hash functions and comparing the bit positions generated against the bloom filter bit vector. If all of the generated bit positions for a V.Dest value have a value of one, then the row pertaining to that V.Dest is included in the response message. Otherwise, that row is dropped. Note that since this is a probabilistic form of compression of the data values, using a bloom filter will result in a small percentage likelihood of more rows being returned than if the S.Name values had been enumerated—but it does so at a savings in query message size.

According to a specific embodiment, after predicate groups have been determined, it remains to be decided in what order they will be sent as messages. Choosing the right order can have a significant impact on the network traffic produced by the query. Consider the query and predicate groups shown in FIG. 7. As is described above, non-local joins are unfolded, so the join predicate is listed in both groups. If group 2 were issued first, all vehicles worldwide that are within 60 minutes of their destination would respond, probably generating a significant amount of network traffic (and mostly unnecessary). If group 1 were issued first, only stations in California would respond (indeed, only stations in California will receive the query); using the S.Names which are retrieved from this first message, the join predicate can be used as a filter for the second message, and a much smaller number of vehicles will respond.

In a preferred specific embodiment, in order for the query processor to choose a preferred ordering for the messages, and also to choose an appropriate routing key (as mentioned earlier for a specific embodiment in the section "Routing Over Network of Network Messages"), the schema definition specification is extended to include a "rank" for each table attribute. The database designer chooses ranks for each attribute based on the semantics of schema, based on the following guidelines: Attributes which partition the records along network topology get highest rank; and attributes which have a large number of different values are ranked higher than attributes which have a small number of different values. Once given these guidelines, choosing the best rankings can be reasonably straightforward. In the example schema, attributes Station.State and Vehicle.Dest would have high ranks, and attributes Package.SpecHandling and Vehicle.Status would have low ranks.

To order the predicate groups within a clause, the non-join predicate with the highest rank is selected, and its group is chosen to be issued first. Joins are then unfolded to determine the order of the rest of the groups. In the case that two predicate groups in the same clause are unjoined, which in SQL indicates a cross-product, the groups can be resolved in parallel. An IN predicate (indicating a subquery) is treated as a non-join predicate for purposes of ranking.

According to this specific embodiment, predicate groups are converted to messages and issued in the order determined by the query decomposer. The presence of subqueries, OR clauses, and/or cross-products allows for a significant amount of parallelism. As described, non-local joins are unfolded and intermediate results are issued along with later messages to filter the number of replies. A predicate group containing an IN predicate waits for the sub-query to be resolved before being issued. In the case that the first part of a join, or one part of a cross-product, generates no results, the other messages in the clause are not sent; there is no result from that clause. In the case that a sub-query returns no result, the clause containing the IN predicate is not resolved; there is no result from that clause.

C. Designated Join Nodes

The embodiments described above primarily discuss the processing (including joining) of returned information sent in the various reply messages at the querying node or at the data source. However, in other specific embodiments, the processing of returned information can be performed as the information returns through the network through progressive joins, or the task of performing joins can be delegated to specific nodes, called "designated join nodes" or "designated joiners", which lie along the upstream path from the queried data producing nodes to the querying node and which possess greater computational ability or memory than the data producing nodes. In both cases, the processing that is done is passive. In other words, the designated joiner will not actively attempt to gather information in order to process it. Instead, the designated joiner node will simply act on the stream of information as it journeys through the designated joiner node.

Designated join nodes perform computations in a distributed manner on returning information in reply messages as they arrive at the designated join nodes. In addition to performing joins, designated join nodes can perform averages, etc. In specific embodiments where designated join nodes are used, the routing of network messages to data sources of the appropriate type by the routing system (step 104 in FIG. 2) would include the participation of designated join nodes associated with such relevant data sources. With embodiments using progressive joins or designated joiners, the processing of reply messages at the querying node will be reduced or simplified, as much of the processing will have occurred such that the returned information sent to the querying node has been previously processed. Designated join nodes are particularly useful when the system uses a mix of lower-cost, lower-functionality data sources (i.e., data producing nodes) and higher-cost, higher-functionality active components (e.g., data producing/consuming nodes, data producing nodes, or routers, with higher processing power and/or more memory). This mix of devices can occur, for example, when upgrading an existing network of data sources or when overall system cost savings are desired.

D. Designated Query Nodes

Oftentimes, it is not possible to simply process or join information as it flows upstream along the query routing tree. This is because the joins may need information from multiple sites that are not part of the same routing tree subtree. Therefore, the majority of the joining would occur at the query sender's node at the root of the tree. Also, when the data sources contain large amounts of data, or the number of sources is large, applying join operations throughout the upstream path towards the querying node can significantly reduce the throughput of the routers and, therefore, the efficiency of the overall system. In such situations, a preferred approach is that more advanced query planning be done so that whole subqueries will be pushed closer to the data sources. The node to which the subquery is pushed becomes the "designated query node" for that subquery and will actively process that subquery by gathering information from all relevant data sources, performing any joins, and only sending the result back to the sender. Additionally, the designated query node itself may recursively designate another node to process a smaller part of the subquery and its corresponding joins.

The subquery needs to be pushed as close as possible to the data sources so as to reduce the overall network traffic. Since data needs to be correlated, this involves a trade-off between bringing the subquery to the data vs. bringing the data to the subquery. The relevant information is available from the underlying routing system. With the relevant information or a "peek" into the routing system, the existence of relevant receivers or data sources and the routing tree from the sender (querying node) to those receivers is revealed. This is especially important for large numbers of thin sources.

The sender can extract the complete routing tree for the query by interfacing with the local router using the router's routing protocol interface. A designated query node could be placed at a main branch point in the routing tree, according to a specific embodiment. In terms of necessary and sufficient information, both the routing tree itself and the location of the enhanced routing nodes on the tree that could become a designated query node are needed to calculate the best location to position the designated query node, according to some specific embodiments. However, if the underlying routing system also reports additional information, such as the network bandwidth constraints of the various tree segments, the amount of information relevant to the query stored at each receiver, etc., then the query planning can take into account those variables as well when determining the designated query node.

With the routing tree and enhanced node information, the sender can determine the centroid location between all of the receivers and the sender, according to a preferred embodiment. The centroid is effectively the query's "center of gravity." As such, it is the point where it is equally costly to bring query-relevant data from any of the receivers to a central point to be joined together. In this cost analysis, the following example point system could be used:

Each data tuple (row) is awarded a point

Each network hop is awarded a point

Network segments are awarded point based on their bandwidth constraints. Segments with high bandwidth capability are awarded higher points than segments with low bandwidth.

Other points can be awarded based on other criteria, such as the processing capabilities of the enhanced routing nodes on the routing tree.

For example, if only the routing tree is known, then the centroid is the location that is equidistant between all of the receivers and the sender. If additional information is taken into account, such as the amount of query relevant information stored at each node, then the centroid would be the median point such that, if one were to draw a line through that point, there would be just as much query-relevant data on one side of the line as there is on the other.

The designated query node closest to that centroid location would become the designated query node. The designated query node will execute the subquery completely by issuing query fragments to collect the data to be correlated, joining it, and then sending only the response back to the sender (querying node). In specific embodiments where designated query nodes are used, the collecting of replies from data sources of the appropriate type by the network interface of the querying node (step 110 in FIG. 2) would be preceded by any processing performed by designated query nodes associated with relevant data sources and the sending of reply messages by the designated query nodes to the querying node.

III. Achieving Event-based Capability by Pushing Declarative Functionality

An alternative embodiment extends traditional database queries with an optional additional specification by specifying a "function" and, optionally, a "function body." The specified function could be executed at the sender side, data source side, or at a designated query node. In general this allows data processing functions to be added, in an ad hoc or possibly temporary manner, for purposes of reducing network traffic. In addition, this mechanism can be used to distribute new global schemas, local-global schema mappings or both, to data source nodes. By sending such functions, this capability subsumes other capabilities such as the optional refresh rate. The refresh rate could be specified instead as a function that re-executes the query after sleeping for a specified period of time.

By pushing functionality in the form of declarative steps within one or more functions in conjunction with a query and its query constraints, the effect is to endow this embodiment with an event-based capability. The event is defined by the query constraints and further defined or refined by the declarative steps in the function. The actions to be taken when the event occurs can be further specified as part of the declarative steps within the function.

A. Distributing Data Management Functionality

In this embodiment, the user could indicate the function within the query in several ways, including:

Acting on information projected by the query (in the "select" part of the query)

Acting on information projected from a subquery

Acting on information from a join

Acting on a constraint field

Taking no parameters and simply providing constraints as part of the query. In this case, the function would take no parameters in the query but could gather other information directly from the data source nodes that are beyond a data query language like SQL, such as testing for the existence of known flaws in the data source main processor that could affect the data response.

According to a specific embodiment, queries may specify the function body as well. This function body would be written in a declarative interpreted language, such as Java or TCL. The user would then indicate in the query that a function "closure" is included. He would then indicate the function body by either writing the function code as part of the closure statement or by indicating the file containing the function body.

In accordance to a specific embodiment, the relevant parts of the query message, including the function information, for each data source are:

1. A list of constraints, possibly empty, based on which the data source should decide to send information. These constraints would include the name of the function and the Table and Attribute fields that are the input parameters for it.

2. A list of return values which the data source should return if the constraints are satisfied 3. Optionally, a function closure section would list each function along with its function body.
4. A unique message ID
5. The address of the querying node.

The system then sends each message over the network.

B. Installation of Data Source Functions

According to this embodiment, an interpreted language or Just-In-Time (JIT) compiler is used to provide a programmatic interface to the data joiner (i.e.—designated join or designated query nodes) and the data sources (i.e.—local joiners). The JIT or interpreted language allows for users to create functionality in an ad-hoc manner and push it along with the query to perform application-specific calculations at the data-source side. Such functionality would be stored temporarily for the duration of the query and then removed. Alternatively, an administrator could pre-load a data joiner or data source with a standard library of functions to be provided to users of the system. The administrator would be able to permanently add or delete functionality easily by dynamically adjusting the library.

The following are examples of the uses of distributing instructions for data processing:

1) Distribution of object class methods to object-oriented data sources
2) Distribution of data reduction instructions such as averaging, delta extraction (reporting only the changes in a large data set), peak extraction, or hashing.
3) Distribution of data compression instructions
4) Distribution of trend analysis instructions that extract relevant summaries from large data sets.

For distributing schemas and schema mappings, this embodiment makes schema translation dynamic by making each translation a library function. Local administrators can localize standard functions to the particulars of their site's set-up by adjusting the library function. This is like writing software "drivers" for the local data store. The data management system can come equipped with default functions for typical data sources, such as an SQL database. Global system administrators could also spread their global schema changes as translation functions that are targeted for the standard library interface.

C. Ending Refreshing Queries

In accordance with a specific embodiment, queries for which a function has been specified continue until terminated. Any node may terminate a query by sending a special "terminate query" message to each data source meeting the data source-type referenced in the query. This termination message includes the message IDs of the network messages to be terminated. The data source's network interface then removes the network message from its list of outstanding queries.

Optionally, as was discussed earlier, a "MaximumReplyLifetime" may be assigned to either a query, a data source, or a designated query node so that the network interface of each data source or designated query node will automatically delete any network messages after their lifetime has elapsed. This becomes especially important when pushing functions to designated query nodes or to data sources because the functions themselves may experience exceptions that leave them inoperable and non-responsive. The value of the MaxiumumReplyLifetime can be determined on a case-by-case basis for each data source or it can be specified by some configured default value. A separate thread within the data source software or the designated query node will continuously check through all of the buffers looking for any query message that was received at a time greater than MaxiumuniReplyLifetime units ago. If any such message is found, it is deleted from the buffer. At the time that a query is terminated, the querying node also erases any reply messages relating to that query that are still in its buffers.

IV. Handling Unreachable Data Sources

In practice, widely distributed systems are prone to temporary service outages due to unreliable communications (such as many wireless protocols, or service outages from third-party Internet service providers). Improvement in the robustness of the system can be gained through the use of archives, in accordance with specific embodiments of the invention. Archives are data collectors who periodically poll one or more data sources, and record their values. The archives also advertise a characteristic to show that they are the archive for particular data sources. In the case that a request is made to a data source that does not respond, the present system according to these specific embodiments can re-route the request to the archive. The data received will not necessarily be current; but in some applications old data is preferable to no data.

The re-routing capability can be implemented either in the underlying routing system or in the client-side querying software of the present system. In the former case, routers are responsible to deliver data from an archive if an adjacent data source does not respond. In the latter case, the network provides a list of successfully accessed data sources, and the query software resends the request to archives including the success list. The archives then respond if they represent data sources that match the routing characteristics but are not on the success list.

V. Conclusion

The description above illustrates various specific embodiments, and it is understood that the present invention is not necessarily limited to the described embodiments. Variations or modifications of the described embodiments could be made without departing from the scope of the invention, which is to be limited only by the issued claims.

What is claimed:

1. A method for information management of a distributed data sources network database that comprises a plurality of nodes, said plurality of nodes including a querying node and a plurality of data sources, said method comprising the steps of:

providing a schema for said distributed data sources network database;

entering a query in a database language at said querying node in said network, said query including at least one table name, at least one a table attribute, and at least one value of a table attribute;

decomposing said query into at least one network message including a particular set of a table name, a table attribute and a value;

transmitting said network message to data sources relevant to said particular set of said table name, said table atribute and said value in said query;

receiving at least one reply message from said data sources relevant to said particular set of said table name, said table attribute and said value of said query when said query is met; and providing a query result in said database language at said querying node from said at least one reply message.

2. The method according to claim 1, wherein said schema providing step includes providing a rank for each table attribute, end wherein a relative value of said rank of said table attribute in said query is used to select which table, table attribute, and value will be used as a routing key in said transmitting step.

3. The method of claim 2 wherein said rank for each attribute is selected based on attributes partitioning the records along network topology getting highest rank and attributes having a large number of different values are ranked higher than attributes which have a small number of different values.

4. The method according to claim 1, further comprising a step of resolving any joins contained in said query once said at least one reply message has been received.

5. The method according to claim 1, wherein said network message is an Ethernet packet, IP packet, TCP packet, UDP packet, Profibus packet, DeviceNet packet, IEEE 802.11 packet, Ricochet packet, GSM formatted packet, or CDMA formatted packet, or multiple of said packets.

6. The method according to claim 1, wherein said query language comprises SQL.

7. The method according to claim 1, wherein said transmitting step comprises routing said network message to data sources relevant to said query by using characteristic routing.

8. The method according to claim 1, wherein said transmitting step comprises routing said network message only to data sources relevant to said query by using multicast routing.

9. A method for information management of a distributed data sources network database that comprises a plurality of nodes, said plurality of nodes including a querying node and a plurality of data sources, said method comprising the steps of:

providing a schema for said distributed data sources network database;

entering a query in a database language at said querying node in said network, said query including at least one class name, at least one class attribute, and at least one value of a class attribute;

decomposing said query into at least one network message including a particular set of a class name, a class attribute and a value;

transmitting said network message to data sources relevant to said particular set of said class name, said class attribute and said value in said query;

receiving at least one reply message from said data sources relevant to said particular set of said class name, said class attribute and said value of said query when said query is met; and providing a query result in said database language at said querying node from said at least one reply message.

10. The method according to claim 9, wherein said scheme providing step includes providing a rank for each class attribute, and wherein a relative value of said rank of said class atribute in said query is used to select which class, class attribute, end value will be used as a routing key in said transmitting step.

11. The method according to claim 9, further comprising a step of resolving any joins contained in said query once said at least one reply message has been received.

12. The method according to claim 9, wherein said network message is an Ethernet packet, IP packet, TCP packet, UDP packet, Profibus packet, DeviceNet packet, IEEE 802.11 packet, Ricochet packet, GSM formatted packet, or CDMA formatted packet, or multiple of said packets.

13. The method according to claim 9, wherein said query language comprises SQL.

14. The method according to claim 9, wherein said transmitting step comprises routing said network message to data sources relevant to said query by using characteristic routing.

15. The method of claim 10 wherein said rank for each attribute is selected based on attributes partitioning the records along network topology getting highest rank and attributes having a large number of different values are ranked higher than attributes which have a small number of different values.

16. The method according to claim 9, wherein said transmitting step comprises routing said network message only to data sources relevant to said query by using multicast routing.

17. A method for information management of a distributed data sources network database that comprises a plurality of nodes, said plurality of nodes including a querying node and a plurality of data sources, said method comprising the steps of:

providing a schema for said distributed data sources network database;

entering a query in a database language at said querying node in said network, said query including at least one tag name, at least one tag attribute, and at least one value of a tag attribute;

decomposing said query into at least one network message including a particular set of a tag name, a tag attribute and a value;

transmitting said network message to data sources relevant to said particular set of said tag name, said tag attribute and said value in said query;

receiving at least one reply message from said data sources relevant to said particular set of said tag name, said tag attribute and said value of said query when said query is met; and providing a query result in said database language at said querying node from said at least one reply message.

18. The method according to claim 17, wherein said schema providing step including providing a rank for each tag attribute, and wherein a relative value of said rank of said tag attribute in said query is used to select which tag table, tag attribute, and value will be used as key a routing key in said transmitting step.

19. The method of claim 18 wherein said rank for each attribute is selected based on attributes partitioning the records along network topology getting highest rank and attributes having a large number of different values are ranked higher then attributes which have a small number of different values.

20. The method according to claim 17, further comprising a step of resolving any joins contained in said query once said at least one reply message has been received.

21. The method according to claim 17, wherein said network message is an Ethernet packet, IP packet, TCP packet, UDP packet, Profibus packet, DeviceNet packet, IEEE 802.11 packet, Ricochet packet, GSM formatted packet, or CDMA formatted packet, or multiple of said packets.

22. The method according to claim 17, wherein said query language comprises SQL.

23. The method according to claim 17, wherein said transmitting step comprises routing said network message to data sources relevant to said query by using characteristic routing.

24. The method according to claim 17, wherein said transmitting step comprises routing said network message only to data sources relevant to said query by using multicast routing.

25. A method for information management of a distributed data sources network database that comprises a plurality of nodes, said plurality of nodes including a querying node and a plurality of data sources and a plurality of archive nodes representing particular data sources, said method comprising the steps of:

provididing a schema for said distributed data sources network database;

entering a query in a database language at said querying node in said network;

decomposing said query into at least one network message;

transmitting said network message to data sources relevant to said query;

receiving from said network a list of successfully accessed data sources;

retransmitting said network message to said archive nodes and to said data sources on said list;

receiving a reply message from said data sources from said list and from said archive nodes representing those data sources that match said query but are not on said list; and providing a query result in said database language based on said reply message.

26. The method according to claim 25, wherein said network message is an Ethernet packet, IP packet, TCP packet, UDP packet, Profibus packet, DeviceNet packet, IEEE 802.11 packet, Ricochet packet; GSM formatted packet, or CDMA formatted packet, or multiple of said packets.

27. The method according to claim 25, wherein said schema comprises a relational schema, an object-oriented schema, or an object-relational schema.

28. The method according to claim 25, wherein said query language comprises SQL.

29. The method according to claim 25, wherein said transmitting step comprises routing said network message to data sources relevant to said query by using characteristic routing.

30. The method according to claim 25, wherein said transmitting step comprises routing said network message only to data sources relevant to said query by using multicast routing.

31. A method for information management of a distributed data sources network database that comprises a plurality of nodes, said plurality of nodes including a querying node and a plurality of data sources, said method comprising the steps of:

providing a schema for said distributed data sources network database, said schema providing a list of descriptors which are locally joinable;

entering a query in a database language at said querying node in said network, said query including a plurality of predicates;

decomposing said query into at least one network message;

transmitting said network message to data sources relevant to said plurality of predicates of said query;

receiving from said data sources relevant to said query a reply message to said network message when those predicates of said query which are included in said list of locally joinable descriptors are locally joined at said data sources; and proviuding a query result in said database language at said querying node from said reply message.

32. The method according to claim 31, wherein said network message is an Ethernet packet, IP packet, TCP packet, UDP packet, Profibus packet, DeviceNet packet, IEEE 802.11 packet, Ricochet packet, GSM formatted packet, or CDMA formatted packet, or multiple of said packets.

33. The method according to claim 31, wherein said schema comprises a relational schema and said descriptors comprise attributes or tables, an object-oriented schema and said descriptors comprise class attributes or classes, or an object-relational schema.

34. The method according to claim 31, wherein said query language comprises SQL.

35. The method according to claim 31, wherein said transmitting step comprises routing said network message to data sources relevant to said query by using characteristic routing.

36. The method according to claim 31, wherein said transmitting step comprises routing said network message only to data sources relevant to said query by using multicast routing.

37. The method according to claim 31 wherein said transmitting step comprises transmitting a bloom filter bit vector with a bit vector representation less than a specified threshold.

38. A method for information management or a distributed data sources network database that comprises a plurality of nodes, said plurality of nodes including a querying node and at least one designated query node and a plurality of data sources, said method comprising the steps of:

providing a schema for said distributed data sources network database;

entering a query in a database language at said querying node in said network, said query including a plurality of subqueries;

decomposing said query into a plurality of network messages, one of said plurality of said network messages corresponding to one of said plurality of subqueries;

transmitting one of said plurality of said network messages to a designated query node relevant to said one of said plurality of subqueries of said query, said at least one designated query node processing said one of said plurality of subqueries and transmitting query fragments of said query to data sources relevant to said query fragments and for which said at least one designated query node is responsible;

receiving from said at least one designated query node a reply message to said network message when responses to said query fragments are joined and said query is met; and providing a query result in said database language at said querying node from said reply message.

39. The method of claim 38 wherein said schema provides a list of descriptors which are locally joinable, wherein said schema is a relational schema and said descriptors include attributes or tables or wherein said schema is an object-oriented schema and said descriptors include class attributes or classes.

40. The method of claim 38 wherein said at least one designated query node is located at main branch points of said distributed data sources network database.

41. The method according to claim 39, wherein said schema providing step includes providing a rank for each attribute, and wherein said query includes an attribute, and wherein a relative value of said rank of said attribute in said query is used to select a routing key in said transmitting step.

42. The method according to claim 38, wherein said network message is an Ethernet packet, IP packet, TCP packet, UDP packet, Profibus packet, DeviceNet packet, IEEE 802.11 packet, Ricochet packet, GSM formatted packet, or CDMA formatted packet, or multiple of said packets.

43. The method according to claim 38 wherein said rank for each attribute is selected based on attributes partitioning the records along network topology getting highest rank and attributes having a large number of different values are ranked higher than attributes which have a small number of different values.

44. The method according to claim 43, wherein said query language comprises SQL.

45. The method according to claim 38, wherein said transmitting step comprises routing said network message to data sources relevant to said query by using characteristic routing.

46. The method according to claim 38, wherein said transmitting step comprises routing said network message only to data sources relevant to said query by using multicast routing.

47. The method according to claim 38 wherein said at least one designated query node is located close to a centroid location of said distributed data sources network database, wherein said centroid location comprises an optimal location between said querying node and said data sources relevant to said query.

48. The method according to claim 47 wherein said optimal location comprises the point equidistant between said querying node and said data sources relevant to said query.

49. The method according to claim 47 wherein said optimal location comprises the point where there would be as much query-relevant data on one side as on the other side of said point.

50. A method for information management of a distributed data source network database that comprises a plurality of nodes, said plurality of nodes including a querying node and a plurality of data sources, said method comprising the steps of:
providing a schema for said distributed data sources network database;
distributing one or more functions to at least one node;
entering a query in a database language at said querying node in said network;
decomposing said query into at least one network message;
transmitting said network message to data sources relevant to said query;
receiving from said data sources relevant to said query a reply message to said network massage when said query is met and said one or more functions are applied; and
providing a query result in said database language at said querying node from said reply message.

51. The method of claim 50 wherein said one or more functions comprise instructions, said instructions comprising object class methods distributed to said at least one node, which comprises an object-oriented data source.

52. The method of claim 51 wherein said one or more functions relates to new aspects of said schema.

53. The method of claim 51 wherein said instructions relate to new aspects of said schema.

54. The method of claim 50 wherein said one or more functions comprise instructions, said instructions comprising distribution of data reduction instructions.

55. The method of claim 50 wherein said one or more functions comprise instructions, said instructions comprising averaging, delta extraction, peak extraction or hashing.

56. The method of claim 50 wherein said one or more functions comprise instructions, said instructions comprising distribution of data compression instructions.

57. The method of claim 50 wherein said one or more functions comprise instructions, said instructions comprising distribution of trend analysis instructions that extract relevant summaries.

58. The method of claim 50 wherein said at least one node comprises a data source.

59. The method of claim 50 wherein said at least one node comprises a designated join node.

60. The method of claim 59 further comprising the steps of receiving said network message at said designated join node, performing said one or more functions at said designated join node, and receiving from data sources relevant to said query responses to portions of said query from said network message in accordance with said one or more functions.

61. The method of claim 60 further comprising the steps of receiving said network message at said designated query node; performing said instructions at said designated query node, and receiving from data sources relevant to said query responses to portions of said query from said network message in accordance with said instructions.

62. The method according to claim 50 wherein said distributing step also includes distributing the bodies of one or more functions with one or more functions closures to said at least one node.

63. The method according to claim 62 wherein said at least one node comprises a querying node.

64. The method according to claim 62 wherein said at least one node comprises a designated query node.

65. The method according to claim 50 wherein said distributing step can be done through said query.

66. The method according to claim 50 further comprising the step of sending a terminate query message to said data sources relevant to said query.

67. The method of claim 50 wherein said instructions comprise distribution of trend analysis instructions that extract relevant summaries.

68. The method of claim 50 wherein said at least one node comprises a data source.

69. The method of claim 50 wherein said at least one node comprises a designated query node.

70. The method of claim 50 wherein said query includes events or exceptions descriptions in the form of query constraints and/or a specified refresh rate and/or as part of the declarative steps in the said one or more functions, and wherein said one or more functions comprise an action to be taken when said events or said exceptions occur, and further comprising the step of performing said one or more functions at said at least one node to provide an event-based system reaction.

71. A system for information management of a distributed database comprising a network of data sources, said system comprising:
a plurality of data sources coupled to said network, said data sources capable of providing information according to a schema for said distributed database;
at least one querying node coupled to said network, said querying node capable of receiving a query in a database language and decomposing said query into at least one network message that is transmitted over said network to data sources relevant to said query;

wherein data sources relevant to said query send a reply message over said network in response to said network message when said query is met, and said querying node provides a query result in said database language from said reply message; and wherein said plurality of data sources includes at least one data source capable of performing local joins on said query.

72. The system according to claim 71, wherein said network message and said reply message are Ethernet packets, IP packets, TCP packets, UDP packets, Profibus packets, DeviceNet packets, IEEE 802.11 packets, Ricochet packets, GSM formatted packets, or CDMA formatted packets, or multiple of said packets.

73. The system according to claim 71, wherein said schema comprises a relational schema, an object-oriented schema, or an object-relational schema.

74. The system according to claim 71, wherein said query language comprises SQL.

75. The system according to claim 71, wherein said network message is transmitted using characteristic routing over said network only to data sources relevant to said query.

76. The system according to claim 71, wherein said network message is transmitted using multicast routing over said network only to data sources relevant to said query.

* * * * *